United States Patent
Haruta et al.

(10) Patent No.: US 10,173,818 B2
(45) Date of Patent: Jan. 8, 2019

(54) HEAT-SHRINKABLE POLYESTER FILM, AND PRODUCTION METHOD THEREFOR AND PACKAGE THEREOF

(71) Applicant: TOYOBO CO., LTD., Osaka-shi, Osaka (JP)

(72) Inventors: Masayuki Haruta, Tsuruga (JP); Shintaro Ishimaru, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/745,990

(22) PCT Filed: Jul. 22, 2016

(86) PCT No.: PCT/JP2016/071558
§ 371 (c)(1),
(2) Date: Jan. 18, 2018

(87) PCT Pub. No.: WO2017/018345
PCT Pub. Date: Feb. 2, 2017

(65) Prior Publication Data
US 2018/0208375 A1    Jul. 26, 2018

(30) Foreign Application Priority Data

Jul. 24, 2015 (JP) ................................. 2015-146588
Aug. 6, 2015 (JP) ................................. 2015-155881

(51) Int. Cl.
*B65D 65/02* (2006.01)
*B29C 55/12* (2006.01)
(Continued)

(52) U.S. Cl.
CPC .............. *B65D 65/02* (2013.01); *B29C 55/12* (2013.01); *B29C 55/14* (2013.01); *B29C 61/06* (2013.01);
(Continued)

(58) Field of Classification Search
CPC .. B65D 65/02; B65D 23/0878; B65D 25/205; B65D 75/002; B29C 55/12; B29C 61/06;
(Continued)

(56) References Cited

U.S. PATENT DOCUMENTS

| 4,996,291 A | 2/1991 | Yoshinaka et al. |
| 2009/0304997 A1 | 12/2009 | Haruta et al. |
| 2015/0014202 A1 | 1/2015 | Haruta et al. |

FOREIGN PATENT DOCUMENTS

| JP | H05-033895 B2 | 5/1993 |
| JP | 4752360 B2 | 8/2011 |

(Continued)

OTHER PUBLICATIONS

Japanese Patent Office, International Search Report in International Patent Application No. PCT/JP2016/071558 (dated Oct. 11, 2016).

*Primary Examiner* — Michael C Miggins
(74) *Attorney, Agent, or Firm* — Leydig, Voit & Mayer, Ltd.

(57) ABSTRACT

The invention provides a heat-shrinkable polyester film which has a high heat shrinkage rate in the width direction, exhibits a low heat shrinkage rate in the longitudinal direction, and has a great mechanical strength in the longitudinal direction, good openability along perforations, and excellent shrink finish. The film has a hot-water heat shrinkage rate of 40% to 85% in the main shrinking direction and −5% to 15% in the perpendicular direction when the film is immersed in hot water at 98° C. for 10 seconds, and a maximum shrinkage stress of 2-7 MPa in the main shrinking direction when measured in hot air of 90° C. and the shrinkage stress 30 seconds after measurement of the shrinkage stress has started is of 60-100% of the maximum shrinkage stress. The film contains 6 mol % or more of diethylene glycol-derived constituent units with respect to 100 mol % of all polyester resin components.

20 Claims, 1 Drawing Sheet

(51) Int. Cl.
    *B29C 61/06*     (2006.01)
    *C08J 5/18*     (2006.01)
    *B29C 55/14*     (2006.01)
    *B65D 23/08*     (2006.01)
    *B65D 25/20*     (2006.01)
    *B65D 75/00*     (2006.01)
    *B29K 67/00*     (2006.01)
    *B29K 105/02*     (2006.01)

(52) U.S. Cl.
    CPC ....... *B65D 23/0878* (2013.01); *B65D 25/205* (2013.01); *B65D 75/002* (2013.01); *C08J 5/18* (2013.01); *B29K 2067/003* (2013.01); *B29K 2105/02* (2013.01)

(58) Field of Classification Search
    CPC ...... B29C 55/14; C08J 5/18; B29K 2067/003; B29K 2105/02
    See application file for complete search history.

(56) References Cited

FOREIGN PATENT DOCUMENTS

| | | |
|---|---|---|
| JP | 5067473 B2 | 11/2012 |
| JP | 5151015 B2 | 2/2013 |
| JP | 5240387 B1 | 7/2013 |

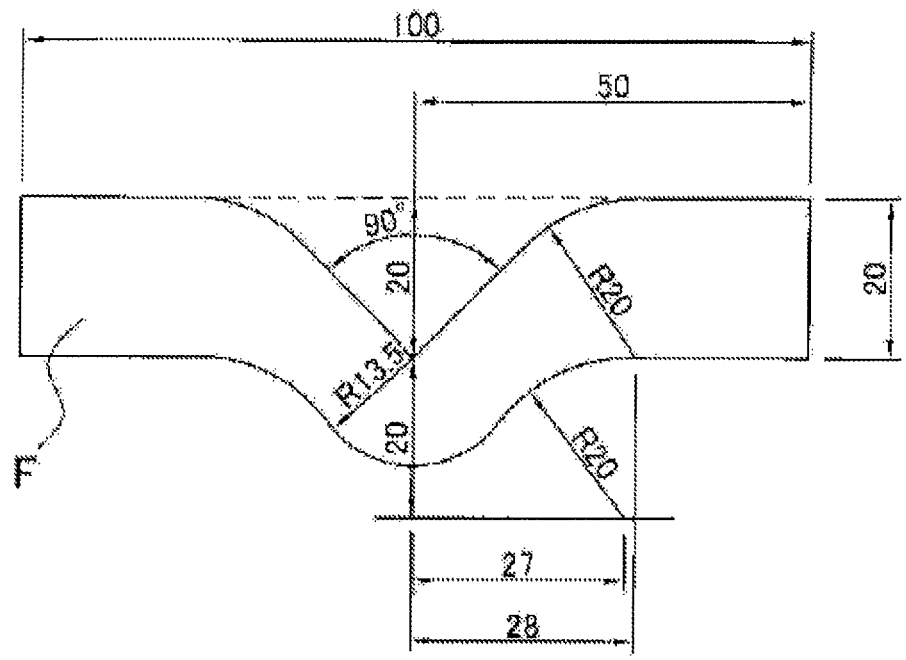

HEAT-SHRINKABLE POLYESTER FILM, AND PRODUCTION METHOD THEREFOR AND PACKAGE THEREOF

CROSS-REFERENCE TO RELATED APPLICATIONS

This patent application is the U.S. national phase of International Patent Application No. PCT/JP2016/071558, filed Jul. 22, 2016, which claims the benefit of Japanese Patent Application No. 2015-146588, filed on Jul. 24, 2015, and of Japanese Patent Application No. 2015-155881, filed on Aug. 6, 2015, which are incorporated by reference in their entireties herein.

TECHNICAL FIELD

The present invention relates to a heat-shrinkable polyester film suitable for heat-shrinkable labels, a method for producing the same, and a package using the label.

BACKGROUND ART

Recently, in applications such as label package doubling as a protection of a glass bottle or a plastic bottle etc. and a display of articles, cap sealing and accumulation package, there has been widely used, as a shrink label, a polyester-based heat-shrinkable film which is high in heat resistance, easy to incinerate, and excellent in solvent resistance. The use amount of the polyester-based heat-shrinkable film tends to increase accompanied by an increase of PET (polyethylene terephthalate) containers.

Heretofore, a heat-shrinkable polyester film has been widely utilized which shrinks greatly in the width direction. It is also known that the shrinkage rate in the longitudinal direction, which is a non-shrinking direction, is made to be below zero (so-called extend due to heating) so that satisfactory shrinkage finishing properties are achieved (Patent Document 1).

Although the heat-shrinkable polyester film in which the width direction is the main shrinking direction is subjected to drawing at a high ratio in the width direction to exhibit the shrinkage properties in the width direction, with respect to the longitudinal direction perpendicular to the main shrinking direction, there are many cases in which the film is only subjected to drawing at a low ratio and there is also a case in which the film is not subjected to drawing. The film subjected to drawing at a low ratio in the longitudinal direction and the film subjected to drawing only in the width direction have a drawback that the mechanical strength in the longitudinal direction is poor. Moreover, when the film is subjected to drawing in the longitudinal direction to improve the mechanical strength in the longitudinal direction, the mechanical strength in the longitudinal direction increases, but the shrinkage rate in the longitudinal direction also increases, which in turn deteriorates shrinkage finishing properties. There are heat-shrinkable films that solve these drawbacks and thermally shrink only in the width direction while drawing in two directions of the longitudinal direction and the width direction described in Patent Documents 2 and 3. By drawing them biaxially, attenuation of shrinkage stress is small and good shrink finish can be obtained.

However, in the claim of Patent Document 2, the shrinkage stress is 3 MPa to 20 MPa, but in Example, it is as high as 8.2 MPa to 18 MPa. In the claim of Patent Document 3, although the shrinkage stress is 7 MPa to 14 MPa, but also in Example, it is 8.1 MPa to 13.3 MPa. This is presumed to be because the drawing stress in the width direction was increased by biaxial drawing.

However, the films of Patent Documents 1 to 3 having the main shrinking direction as the width direction did not have any problem in the containers of the PET bottles for beverages, but there are packages having thin container thickness, such as box lunches and prepared dishes sold at convenience stores and supermarkets and such packages are used with thinner containers for achieving the reduction in the weight of garbage in recent years. When a heat shrinkable film having a highly shrinkage stress is used in a container having a small thickness, problems such as deformation of the container due to shrinkage stress of the film occur at the time of shrinking.

Moreover, in the case of preparing a label for a bottle for beverage from a heat-shrinkable film, it is necessary that the film be formed into a tube shape to be mounted to a bottle and then be allowed to shrink by heat in the peripheral direction of the bottle. For that reason, in the case of forming a heat-shrinkable film which is heat-shrinkable in the width direction into a label, while a tube body is formed such that the width direction of the film becomes the peripheral direction, this tube body must be cut into a label with a prescribed length to be mounted to a bottle. Accordingly, there has been a restriction on the speed for mounting a label composed of a heat-shrinkable film which is heat-shrinkable in the width direction to a bottle, and improvement thereof has been desired.

On that account, recently, a film which is capable of being wound around a bottle directly from a film roll to be formed into a label (the so-called wrap-around) and is heat-shrinkable in the longitudinal direction has been desired. Furthermore, in recent years, a wrapping method of covering the circumference of a synthetic resin-made container for a box lunch or the like with a belt-shaped film to hold the container in a closed state has been developed, and the film which is shrinkable in the longitudinal direction is suitable for such a packaging application. Accordingly, the demand for the film which is shrinkable in the longitudinal direction is expected to dramatically increase in the future.

However, in the film shrinking in the longitudinal direction (Patent Documents 4 to 5), the shrinkage stress in the claim of Patent Document 4 is 6 MPa or more and is as high as 7 MPa or more in Example. In Comparative Example 1, there are films having a shrinkage stress as low as 3.9 MPa, but this is considered due to a low shrinkage rate of 26%. The shrinkage stress in Patent Document 5 is also 6 MPa or more which is similar to that in Patent Document 4, and is as high as 7 MPa or more in Example. In Comparative Example 5, some films have a low shrinkage stress of 4.7 MPa, but this is considered due to a low shrinkage rate of 33%. Therefore, a film requiring a high shrinkage rate and a low shrinkage stress was not obtained. This is presumed to be because the drawing stress in the longitudinal direction was increased by biaxial drawing. However, there was no problem in containers of PET bottles for beverages, but packages with a thin container thickness, such as boxed lunches and side dish containers sold at convenience stores and supermarkets, have recently become thinner for achieving the reduction in the weight of garbage, and thin containers are used therefor in some cases. When a heat shrinkable film having a highly shrinking stress is used in a container having a small thickness, problems such as deformation of the container due to shrinkage stress of the film occur at the time of shrinking.

PRIOR ART DOCUMENTS

Patent Documents

Patent Document 1: JP-B-05-33895
Patent Document 2: Japanese Patent No. 5067473
Patent Document 3: Japanese Patent No. 5240387
Patent Document 4: Japanese Patent No. 4752360
Patent Document 5: Japanese Patent No. 5151015

DISCLOSURE OF THE INVENTION

Problems to be Solved by the Invention

The purpose of the present invention is to provide a heat-shrinkable polyester film which has a high heat shrinkage rate in the main shrinking direction, exhibits a low heat shrinkage rate in a direction perpendicular to the main shrinking direction, and has a great mechanical strength in a direction perpendicular to the main shrinking direction, good openability along perforations, and excellent shrink finish.

The purpose of the first invention of the present application is to provide a heat-shrinkable polyester film in which the width direction is the main shrinking direction and the longitudinal direction is a direction perpendicular to the main shrinking direction.

The purpose of the second invention of the present application is to provide a heat-shrinkable polyester film in which the longitudinal direction is the main shrinking direction and the width direction is a direction perpendicular to the main shrinking direction.

Means for Solving the Problems

Hereinafter, the heat-shrinkable polyester film having the main shrinking direction as the width direction is referred to as the first invention of the present application, and the heat-shrinkable polyester film having the main shrinking direction as the longitudinal direction is referred to as the second invention of the present application, respectively. Unless otherwise noted, these are a matter of the present invention common to both inventions.

The present invention which solves the above-mentioned problems is a heat-shrinkable polyester film satisfying the following requirements (1) to (4):

(1) the hot-water heat shrinkage rate when the film is immersed in hot water at 98° C. for 10 seconds is 40% or more and 85% or less in the main shrinking direction of the film;

(2) the hot-water heat shrinkage rate when the film is immersed in hot water at 98° C. for 10 seconds is −5% or more and 15% or less in a direction perpendicular to the main shrinking direction of the film;

(3) the maximum shrinkage stress is 2 MPa or more and 7 MPa or less in the main shrinking direction of the film when measured in hot air of 90° C., and the shrinkage stress 30 seconds after measurement of the shrinkage stress has started is 60% or more and 100% or less of the maximum shrinkage stress; and (4) the film contains 6 mol % or more of diethylene glycol-derived constituent units with respect to 100 mol % of all polyester resin components.

By including the amount of diethylene glycol (DEG) in the above requirement (4) in the constituent unit of the polyester resin, the inventors of the present invention have found that the drawing stress in the width direction decreases at the time of drawing, but the heat shrinkage rate in the film width direction does not decrease and only the drawing stress in the width direction decreases. Further, it was found that this phenomenon has the same effect even in biaxial drawing, and the present invention has been completed based on these findings.

In the heat-shrinkable polyester film of the present invention, it is preferable that ethylene terephthalate is a main constituent component and 13 mol % or more of a monomer component which can be an amorphous component is contained in the total polyester resin components.

In the heat-shrinkable polyester film of the present invention, one of preferred embodiments is that the main shrinking direction is the width direction of the film.

In the heat-shrinkable polyester film of the present invention, one of preferred embodiments is that the main shrinking direction is the longitudinal direction of the film.

In the heat-shrinkable polyester film of the present invention, the tensile breaking strength in a direction perpendicular to the main shrinking direction of the film is preferably 60 MPa or more and 180 MPa or less.

In the heat-shrinkable polyester film of the present invention, it is preferable that the right-angled tearing strength per unit thickness in a direction perpendicular to the main shrinking direction after shrinking by 10% in warm water at 80° C. in the main shrinking direction is 180 N/mm or more and 350 N/mm or less.

In the heat-shrinkable polyester film of the present invention, the haze is preferably 2% or more and 18% or less.

The present invention also includes a package formed by covering at least a part of the outer periphery of an object to be packaged with a label obtained from the heat-shrinkable polyester film and then shrinking the label on the covered object by heat.

The present invention also includes a method for producing the above heat-shrinkable polyester film, which comprises a drawing process in the main shrinking direction and a drawing process in a direction perpendicular to the main shrinking direction.

Effect of the Invention

The heat-shrinkable polyester film of the present invention has not only a high shrinkage rate but also a low shrinkage stress. Therefore, the heat-shrinkable polyester film of the present invention is suitable also for a thinned container, and it was possible to provide a heat shrinkable film which can package a wider variety of objects than before.

Further, since the heat-shrinkable film is subjected to lengthwise-transverse biaxial drawing or transverse-lengthwise biaxial drawing, the mechanical strength in the longitudinal direction perpendicular to the width direction (main shrinking direction) or in the width direction perpendicular to the longitudinal direction (main shrinking direction) is high. Therefore, when used as a label for a PET bottle or the like, the film can be very efficiently mounted to a container such as a bottle within a short time, and the satisfactory finish with extremely reduced wrinkles and insufficient shrinkage can be exhibited when the film is shrunk by heat. Moreover, since the film strength is large, the processing properties at the time of printing processing and tubing processing are good.

Further, since the shrinkage stress of the film does not attenuate much and is kept high after 30 seconds from the initiation of shrinking, the film exhibits excellent followability even though a container is thermally expanded at the time of heating in the label mounting process, and the label is difficult to be slackened to thereby achieve a good appearance. In addition, since the openability along perforations as a label is satisfactory, the label can be cleanly cut along the perforations from the start of tearing to the end of tearing when opened.

Moreover, since the heat-shrinkable polyester film of the present invention is a film produced by lengthwise-transverse biaxial drawing or transverse-lengthwise biaxial drawing, the film can be very efficiently produced. Further, the heat-shrinkable polyester film of the present invention has an extremely high adhesive force at the time of bonding front and back surfaces (or two front or back surfaces) together by a solvent, and can be suitably used for various cover labels and the like including a label for PET bottles and the like.

The heat-shrinkable polyester film of the present invention includes not only a heat-shrinkable polyester film alone but also a heat-shrinkable film laminated with a different resin having a layer of a heat-shrinkable polyester film.

A package packaged with a label obtained from the heat-shrinkable polyester film of the present invention has a beautiful appearance.

BRIEF DESCRIPTION OF THE DRAWINGS

The figure is an explanatory illustration showing a shape of a test specimen for the measurement of the right-angled tearing strength.

MODE FOR CARRYING OUT THE INVENTION

Hereinafter, the heat-shrinkable polyester film of the present invention will be described in detail. The method for producing the heat-shrinkable polyester film is described in detail later, but the film is usually obtained by conveying it using a roll or the like and drawing it. At that time, the conveying direction of the film is referred to as the longitudinal direction, and the direction perpendicular to the longitudinal direction is referred to as the film width direction. Accordingly, the width direction of the heat-shrinkable polyester film shown below is a direction perpendicular to the roll unwinding direction, and the film longitudinal direction is a direction parallel to the roll unwinding direction. The main shrinking direction of the heat-shrinkable polyester film obtained in Examples and Comparative Examples of the first invention of the present application is the width direction, and the main shrinking direction of the heat-shrinkable polyester film obtained in Examples and Comparative Examples of the second invention of the present application is the longitudinal direction.

As described in Patent Documents 2 and 3, the present inventors in the first invention of the present application have found that for obtaining a heat-shrinkable polyester film having high mechanical strength in the longitudinal direction and good openability along perforations, it is necessary that "molecules not contributing to shrinkage force while being oriented in the longitudinal direction" are present in the film. As a result, a method of drawing in the width direction after drawing in the film lengthwise direction (longitudinal direction), a so-called lengthwise-transverse drawing method, is adopted. In the lengthwise-transverse drawing method, an intermediate heat treatment is performed before the drawing in the width direction so that the shrinkage force in the lengthwise direction after the drawing in the lengthwise direction is relaxed. Further, as described in Patent Documents 4 and 5, the present inventors in the second invention of the present application have found that it is necessary that "molecules not contributing to shrinkage force while being oriented in the width direction" are present in the film so that a heat-shrinkable polyester film having high mechanical strength in the width direction and good openability along perforations is obtained. As a result, a method of drawing in the longitudinal direction after the film transverse direction (width direction), a so-called transverse-lengthwise drawing method, is adopted. In the transverse-lengthwise drawing method, an intermediate heat treatment is performed before the drawing in the longitudinal direction so that the shrinkage force in the transverse direction after the drawing in the transverse direction is relaxed.

One of the techniques for obtaining more highly shrinkable films is a means of increasing the amount of a monomer component (hereinafter simply referred to as amorphous component) which constitutes a unit capable of forming amorphous in a film. Regarding the film obtained by a conventional transverse uniaxial drawing method, it has been found that when the amount of the amorphous component is increased, the shrinkage increases corresponding to the increased amount. However, it has been found out that, regarding the film obtained by the lengthwise-transverse drawing method or the transverse-lengthwise drawing method found by the present inventors, even though the amount of the amorphous component is increased, the shrinkage rate does not increase corresponding to the increased amount. Further increased amount of the amorphous component leads to large unevenness in thickness, causing deterioration in productivity. Therefore, the inventors of the present application focused on diethylene glycol (hereinafter also simply referred to as "DEG").

When diethylene glycol is increased, heat resistance is deteriorated, and discharge of foreign matter is increased by melt extrusion, because of which diethylene glycol has not been actively used up to now. However, the present inventors have found that when diethylene glycol is used as a constituent unit of the polyester resin, the drawing stress at the time of film drawing decreases, and furthermore, only the shrinkage stress can be decreased without lowering the shrinkage rate.

The polyester used in the heat-shrinkable polyester film of the present invention is a polyester whose main constituent component is an ethylene terephthalate unit. Namely, the ethylene terephthalate unit is contained in preferably 50 mol % or more, more preferably 60 mol % or more, and even more preferably 70 mol % or more with respect to 100 mol % of the constituting units of the polyester.

Other dicarboxylic acid components constituting the polyester of the present invention can include aromatic dicarboxylic acids (e.g. isophthalic acid, ortho-phthalic acid, 2,6-naphthalenedicarboxylic acid, etc.), aliphatic dicarboxylic acids (e.g. adipic acid, azelaic acid, sebacic acid, decanedicarboxylic acid, etc.), alicyclic dicarboxylic acids (e.g. 1,4-cyclohexanedicarboxylic acid, etc.) and the like.

Here, the interpretation of the term "can be an amorphous component" will be described in detail.

In the present invention, "amorphous polymer" specifically refers to a case where a polymer does not have an endothermic peak due to melting as measured by DSC differential scanning calorimeter. The amorphous polymer is substantially not crystallized and cannot take a crystalline state or has extremely low degree of crystallization even when crystallized.

In the present invention, the term "crystalline polymer" refers to those which are not "amorphous polymers", that is, those having an endothermic peak due to melting as measured by DSC differential scanning calorimeter. The crystalline polymer is those which can be crystallized, has a crystalline nature, or are already crystallized, when the temperature rises.

Generally, with respect to a polymer in which many monomer units are bonded, when the polymer has various conditions such as low stereoregularity, poor symmetry, large side chain, many branches, and intermolecular low cohesive force, said polymer becomes an amorphous polymer. However, depending on the state of existence, crystallization proceeds sufficiently and may form a crystalline polymer in some cases. For example, even when the polymer has a large side chain and the polymer is composed of a single monomer unit, the crystallization can sufficiently proceed to forma crystalline polymer. Therefore, even in the case of the same monomer unit, the polymer may be crystalline or amorphous sometimes in the present invention, and thus the expression "a unit derived from a monomer that can be an amorphous component" was used.

Here, in the present invention, the monomer unit is a repeating unit constituting a polymer derived from one polyvalent alcohol molecule and one polyvalent carboxylic acid molecule.

In the case where the monomer unit comprising terephthalic acid and ethylene glycol is a main monomer unit constituting the polymer, there can be mentioned a monomer unit consisting of isophthalic acid and ethylene glycol, a monomer unit consisting of terephthalic acid and neopentyl glycol, a monomer unit consisting of terephthalic acid and 1,4-cyclohexanedimethanol, a monomer unit consisting of isophthalic acid and butanediol, and the like as a unit derived from a monomer which can be the amorphous component.

Further, it is preferable not to contain a polyvalent carboxylic acid of tri- or higher-valency (for example, trimellitic acid, pyromellitic acid, anhydride thereof, etc.). A heat-shrinkable polyester film obtained by using a polyester containing these polyvalent carboxylic acids is hard to achieve a necessary high shrinkage rate.

The diol components constituting the polyester include aliphatic diols such as ethylene glycol, 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol, hexanediol, neopentyl glycol and hexanediol; alicyclic diols such as 1,4-cyclohexane-dimethanol; aromatic diols such as bisphenol A; and the like.

The polyester used in the heat-shrinkable polyester film of the present invention must contain a constituent unit derived from diethylene glycol. The constituent unit derived from diethylene glycol is contained in preferably 6 mol % or more, more preferably 7 mol % or more, even more preferably 8 mol % or more per 100 mol % of the constituent unit of the polyester. The upper limit of the constituent unit derived from diethylene glycol is preferably 30 mol % or less, more preferably 28 mol % or less, and even more preferably 26 mol % or less. When the constituent unit derived from diethylene glycol is contained in an amount of 6 mol % or more, the effect of the present invention such as reduction of shrinkage stress is improved, which is desirable. On the other hand, when the diethylene glycol component is contained in an amount of more than 30 mol %, deteriorated substances and disadvantages are increased in the film, which is not preferable.

Further, the polyester has 13 mol % or more of the sum of amorphous components in 100 mol % of the polyhydric alcohol component and in 100 mol % of the polyvalent carboxylic acid component (that is, in 200 mol % of the total) in the whole polyester resin, preferably 15 mol % or more, more preferably 17 mol % or more, particularly preferably 19 mol % or more, most preferably 20 mol % or more. The upper limit of the total of amorphous components is not particularly limited, but is preferably 30 mol % or less, more preferably 28 mol % or less, especially preferably 26 mol % or more. When the amount of amorphous component is set within the above-mentioned range, a polyester having a glass transition point (Tg) being adjusted to 60 to 80° C. is obtained.

It is preferable not to contain a diol having 8 or more carbon atoms (for example, octanediol, etc.) or a polyhydric alcohol with tri- or higher-valency (for example, trimethylolpropane, trimethylolethane, glycerin, diglycerin, etc.) in the polyester. In the heat-shrinkable polyester film obtained by using these diols or polyesters containing polyhydric alcohols, it becomes difficult to attain a necessary high shrinkage rate. It is also preferable not to contain triethylene glycol or polyethylene glycol as much as possible in the polyester.

If necessary, there can be added various additives, such as a wax, an antioxidant, an antistatic agent, a crystal nucleating agent, a viscosity reducing agent, a heat stabilizer, a pigment for coloring, a color protection agent, and an ultraviolet absorber, to a resin for forming the heat-shrinkable polyester film of the present invention.

It is preferable to add fine particles as a lubricant to a resin for forming the heat-shrinkable polyester film of the present invention so that workability (slipperiness) of the film is made better. The fine particles can be arbitrarily selected, and include, for example, inorganic fine particles (e.g. silica, alumina, titanium dioxide, calcium carbonate, kaolin, barium sulfate, etc.), and organic fine particles (e.g. acrylic resin particles, melamine resin particles, silicone resin particles, crosslinked polystyrene particles, etc.). The average particle diameter of the fine particles can be suitably selected in a range of 0.05 to 3.0 μm (when measured by Coulter counter) as needed.

As a method for blending the above-described particles in a resin for forming the heat-shrinkable polyester film, for example, they can be added in an arbitrary step in the production of the polyester resin, but they are preferably added, as a slurry dispersed in ethylene glycol etc. in a step of esterification, or in a step before start of polycondensation reaction and after completion of ester exchange reaction, and then polycondensation reaction is advanced. Further, the blending is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, flame treatment etc. on the heat-shrinkable polyester film of the present invention so that adhesiveness of film surface is enhanced.

Then, the properties of the heat-shrinkable polyester film of the present invention will be described. Regarding the heat-shrinkable polyester film of the present invention, the heat shrinkage rate (that is, a hot-water heat shrinkage rate at 98° C.) in the width direction (main shrinking direction) of the film which is calculated from the lengths before and after shrinkage obtained by dipping the film in a no-load state in hot water of 98° C. for 10 seconds and immediately dipping the film in water of 25° C.±0.5° C. for 10 seconds according to the following equation 1 is 40% and more and 85% or less.

Heat shrinkage rate=[(Length before shrinkage−Length after shrinkage)/Length before shrinkage]×100(%)   Equation 1

When the hot-water heat shrinkage rate in the main shrinking direction at 98° C. is less than 40%, the demand for the high shrinkable film which covers the whole container (so-called full label) cannot be satisfied as well as the shrinkage amount is small. Therefore, strains, insufficient shrinkage, wrinkles, slack and the like are generated on a label after heat shrinkage in the case of being used as the label. The hot-water heat shrinkage rate at 98° C. is preferably 45% or more, more preferably 50% or more, particularly preferably 55% or more, and most preferably 60% or more. Since the degree of demand for the film with a hot-water heat shrinkage rate exceeding 85% in the main shrinking direction at 98° C. is low, the upper limit of the hot-water heat shrinkage rate is set to 85%.

Moreover, with respect to the heat-shrinkable polyester film of the present invention, the hot-water heat shrinkage rate at 98° C. in the direction perpendicular to the main shrinking direction (the longitudinal direction) of the film when measured in the same manner as above is preferably −5% or more and 15% or less. If the hot-water heat shrinkage rate in a direction perpendicular to the main shrinking direction at 98° C. is less than −5%, the film is excessively extended by heating, so that such a ratio is not preferred because at the time of being used as a label for a bottle, a satisfactory shrinkage appearance cannot be attained. Conversely, if the hot-water heat shrinkage rate in a direction perpendicular to the main shrinking direction at 98° C. is more than 15%, the label after heat shrinkage is shortened (reduction in the height of the label), so that such a label is not preferred as a full label because the label area becomes smaller and is not preferred because strains are easily generated on the label after heat shrinkage. The upper limit of the hot-water heat shrinkage rate in a direction perpendicular to the main shrinking direction at 98° C. is preferably 12% or less, more preferably 10% or less, particularly preferably 9% or less, and most preferably 8% or less.

If the hot-water heat shrinkage rate in a direction perpendicular to the main shrinking direction at 98° C. is lower than −5%, the height of the label increases after shrinkage, and as a result, the surplus becomes overabundant and forms wrinkles, so that the lower limit is set to −5%.

With respect to the heat-shrinkable polyester film according to the present invention, the maximum shrinkage stress in the main shrinking direction of the film measured in hot air of 90° C. is preferably 2 MPa or more and 7 MPa or less, and the shrinkage stress after 30 seconds from the initiation of measurement of the shrinkage stress is preferably 60% or more and 100% or less relative to the maximum shrinkage stress. In this connection, the measurement for the shrinkage stress is performed by the method described in Examples.

When the maximum shrinkage stress at 90° C. in the main shrinking direction of the film exceeds 7 MPa, no problem occurs in a container of PET bottle or the like, but in a thin-walled container, collapse occurs due to shrinkage stress upon shrinkage, which is not preferable. The maximum shrinkage stress at 90° C. is preferably 6 MPa or less and more preferably 5 MPa or less. Also, when the maximum shrinkage stress in the main shrinking direction of the film at 90° C. is less than 2 MPa, the label may become loose and may not adhere to the container sometimes at the time of using the film as a label of the container, which is not preferable. The maximum shrinkage stress at 90° C. is more preferably 2.5 MPa or more, even more preferably 3 MPa or more.

The shrinkage stress in the main shrinking direction of the film after 30 seconds from the initiation of measurement in a hot air of 90° C. is preferably 60% or more and 100% or less relative to the maximum shrinkage stress. That is, the heat-shrinkable polyester film of the present invention exhibits specific heat shrinkage properties such that the shrinkage stress almost comparable to the maximum heat shrinkage stress is developed even after 30 seconds from the initiation of shrinking by heat. When the shrinkage stress after 30 seconds/maximum shrinkage stress (hereinafter referred to as "stress ratio") is less than 60% and when the container is shrunk by heating while covering the container with a label, the followability of the label at the time of expanding the container by heating becomes poor and the temperature of the container decreases after shrinkage, resulting in disappearance of thermal expansion, thereby to loosen the label, which is not preferable. The stress ratio is more preferably 75% or more, even more preferably 80% or more, and particularly preferably 90% or more. The larger the stress ratio is, the better the followability becomes, which is preferable. However, since the shrinkage stress after 30 seconds cannot exceed the maximum shrinkage stress, the upper limit of the stress ratio is 100%.

In the heat-shrinkable polyester film of the first invention of the present application, it is preferable that the main shrinking direction is the film width direction. As described above, the longitudinal direction of the heat-shrinkable polyester film is the film-forming direction (line direction) of the heat-shrinkable film and the width direction of the heat-shrinkable polyester film refers to a direction perpendicular to the longitudinal direction. The main shrinking direction in the heat-shrinkable polyester film obtained in Examples and Comparative Examples of the first invention of the present application is the width direction.

In the heat-shrinkable polyester film of the second invention of the present application, it is preferable that the main shrinking direction is the longitudinal direction of the film. The main shrinking direction in the heat-shrinkable polyester film obtained in Examples and Comparative Examples of the second invention of the present application is the longitudinal direction.

In the heat-shrinkable polyester film of the present invention, the tensile breaking strength in a direction perpendicular to the main shrinking direction is preferably 60 MPa or more and 150 MPa or less. The method of measuring the tensile breaking strength will be explained in Examples. If the tensile breaking strength is less than 60 MPa, "stiffness" when the film is attached to a container as a label becomes weak, which is not preferable. In the drawing method of the present invention, it is difficult for the tensile breaking strength to exceed 150 MPa. The tensile breaking strength is more preferably 80 MPa or more, and even more preferably 100 MPa or more. The tensile breaking strength in a direction perpendicular to the main shrinking direction cannot be within the above range unless the lengthwise drawing process is performed in the first invention of the present application and the transverse drawing process is performed in the second invention of the present application, respectively.

In the heat-shrinkable polyester film of the present invention, when right-angled tearing strength per unit thickness in a direction perpendicular to the main shrinking direction of the film after being shrunk by 10% in the main shrinking direction in hot water of 80° C., the right-angled tearing strength per unit thickness in a direction perpendicular to the main shrinking direction is preferably 180 N/mm or more and 350 N/mm or less. The measurement for the right-angled tearing strength is explained in Examples.

When the right-angled tearing strength is less than 180 N/mm, a situation in which the film is easily torn by an impact such as falling during transportation is possibly caused when the film is used as a label, whereby the case is not preferable. On the contrary, when the right-angled tearing strength is larger than 350 N/mm, the cut property (tearability) upon tearing of the label becomes poor, which is not preferable. The right-angled tearing strength is more preferably 250 N/mm or more, even more preferably 280 N/mm or more, and more preferably 330 N/mm or less.

The heat-shrinkable polyester film of the present invention preferably has a haze value of 2% or more and 18% or less. When the haze value exceeds 18%, transparency becomes bad, so that there is a probability that appearance becomes bad in a label production, which is not preferable. Additionally, the haze value is more preferably 15% or less, even more preferably 13% or less, particularly preferably 12% or less, and most preferably 9% or less. Further, the smaller the haze value, the better, but the lower limit is about 2% from considerations that a predetermined amount of a lubricant must be added to the film to provide slipperiness necessary for practical use or the like.

The thickness of the heat-shrinkable polyester film of the present invention is not particularly limited, but is preferably 6 μm or more and 70 μm or less. The more preferred lower limit of the thickness is 10 μm.

In a method for producing the heat-shrinkable polyester film of the present invention, the foregoing polyester raw material is melt-extruded by an extruder to form an undrawn film, and the undrawn film is biaxially drawn by a predetermined method shown below and heat-treated. In this connection, the polyester can be obtained by allowing the suitable dicarboxylic acid component and diol component mentioned above to undergo a polycondensation by a known method. Moreover, usually, two or more kinds of chip-like polyesters are mixed and used as raw materials.

When a raw material resin is melt-extruded, it is preferable to dry the polyester raw material using a dryer such as a hopper dryer and a paddle dryer, or a vacuum dryer. After the polyester raw material is dried in such a manner, the raw material is melted at a temperature of 200 to 300° C. utilizing an extruder and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

In the first invention of the present application, the undrawn film obtained is drawn in the longitudinal direction under predetermined conditions as described below, and the film after the lengthwise drawing is annealed, and then quenched, and next heat-treated, and the film after the heat treatment is cooled under a predetermined condition, drawn in the width direction under a predetermined condition, and heat-treated once again to be able to obtain a heat-shrinkable polyester film of the present invention. Hereinafter, a preferable film forming method to obtain a heat-shrinkable polyester film of the first invention of the present application is described.

[Method for Producing Heat-shrinkable Polyester Film of First Invention of Present Application]

The heat-shrinkable polyester film of the first invention of the present application is formed by the following procedures.
(1) Control of lengthwise drawing condition
(2) Intermediate heat treatment after lengthwise drawing
(3) Natural cooling between intermediate heat treatment and transverse drawing (shutoff of heating)
(4) Forced cooling of film after natural cooling
(5) Control of transverse drawing condition
(6) Heat treatment after transverse drawing
(7) During the above-mentioned production processes, at least two processes in which the film is allowed to relax in the longitudinal direction are provided.

Hereinafter, each of the procedures mentioned above will be sequentially described.

(1) Control of Lengthwise Drawing Condition

In the production of the film by a lengthwise-transverse drawing method according to the present invention, it is necessary to perform the lengthwise drawing of the film at a drawing temperature set to Tg or more and Tg+30° C. or less and at a draw ratio of 3.3 times or more and 4.6 times or less. With respect to the lengthwise drawing, either of single-stage drawing and multi-stage drawing which is two- or more-stage drawing can be used.

When the drawing temperature is too high and the total lengthwise draw ratio becomes larger at the time of drawing a film in the lengthwise direction, the amorphous molecule is drawn out, so that the heat shrinkage rate in the longitudinal direction tends to become larger. Moreover, when the lengthwise draw ratio is too large, it is not preferred because oriented crystallization of the film after the lengthwise drawing progresses, breakage is easily generated in the transverse drawing process, and the shrinkage rate in the transverse direction also lowers after the transverse drawing. Therefore, the upper limit of the lengthwise draw ratio is 4.6 times. The upper limit of the lengthwise draw ratio is more preferably 4.5 times or less, and even more preferably 4.4 times or less. In contrast, when the lengthwise draw ratio is too small, the shrinkage rate in the longitudinal direction is reduced, but it is not preferred because the degree of molecular orientation in the longitudinal direction is also reduced, the right-angled tearing strength in the longitudinal direction is increased, and the tensile breaking strength is reduced. The lengthwise draw ratio is preferably 3.3 times or more, more preferably 3.4 times or more, even more preferably 3.5 times or more.

(2) Intermediate Heat Treatment after Lengthwise Drawing

Heat treatment is conducted after lengthwise drawing to thermally relax the molecules oriented in the longitudinal direction. In this case, after lengthwise drawing of an undrawn film, it is necessary to conduct heat treatment (hereinafter called intermediate heat treatment) of the film over a period of 6.0 seconds or more and 12.0 seconds or less at a temperature of Tg+40° C. or more and Tg+60° C. or less under a state that both edges in the width direction are held by clips in a tenter.

The temperature of the intermediate heat treatment is more preferably Tg+41° C. or more, even more preferably Tg+42° C. or more, and more preferably Tg+58° C. or less, even more preferably Tg+56° C. or less. When the temperature of the intermediate heat treatment is excessively high, the molecular chains oriented by the lengthwise drawing are converted to a crystal, so that the film fails to obtain a high thermal shrinkage rate after transverse drawing. On the other hand, it is necessary that the time for the intermediate heat treatment is appropriately adjusted within a range of 6.0 seconds or more and 12.0 seconds or less depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately adjust the process by the modification of the temperature and the treatment time.

By holding the temperature of the intermediate heat treatment at Tg+40° C. or more, it is possible to increase the degree of molecular orientation in the longitudinal direction, and therefore, it is possible to maintain the tensile breaking strength in the longitudinal direction high while maintaining the right-angled tearing strength low. In contrast, by controlling the temperature of the intermediate heat treatment within a range of Tg+60° C. or less, it is possible to suppress the crystallization of the film. Therefore, by setting the temperature of the intermediate heat treatment to Tg+60° C. or less, crystallization can be suppressed and the shrinkage rate in the width direction can be increased. Moreover, by controlling the temperature of the intermediate heat treatment within a range of Tg+60° C. or less, it is possible to suppress the crystallization of the surface layer of the film to maintain the solvent adhesive strength high, and furthermore, it is also possible to reduce the unevenness of thickness in the longitudinal direction.

(3) Natural Cooling between Intermediate Heat Treatment and Transverse Drawing (Shutoff of Heating)

In the production of a film by the lengthwise-transverse drawing method of the present invention, it is necessary to conduct intermediate heat treatment after lengthwise drawing; however, after the lengthwise drawing and intermediate heat treatment, the film is necessary to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing and intermediate heat treatment is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage rate in the transverse direction cannot be increased sufficiently. Conversely, 3.0 seconds are sufficient time for passing through the intermediate zone, and even though setting a longer time than that, it will lead to needlessness of equipment, which is not preferable. The time for passing through the intermediate zone is more preferably 0.7 seconds or more, even more preferably 0.9 seconds or more, and more preferably 2.8 seconds or less, even more preferably 2.6 seconds or less.

(4) Forced Cooling of Film after Natural Cooling

In the production of a film by the lengthwise-transverse drawing method of the present invention, the naturally cooled film is not transversely drawn as it is, but it is necessary to actively forcibly cool the film such that the temperature of the film is Tg or more and Tg+40° C. or less. By conducting such forced cooling treatment, it becomes possible to obtain a film with good openability along perforations as a label. Further, the temperature of the film after forced cooling is more preferably Tg+2° C. or more, even more preferably Tg+4° C. or more, and more preferably Tg+35° C. or less, even more preferably Tg+30° C. or less.

In forcedly cooling a film, when the temperature of the film after forced cooling keeps exceeding Tg+40° C., shrinkage rate in the width direction of the film becomes low and shrinkage property becomes insufficient as a label, but by controlling the temperature of the film after forcedly cooling at Tg+40° C. or less, it becomes possible to maintain shrinkage rate in the width direction of the film high. Further, if the temperature of the film after forced cooling keeps exceeding Tg+40° C., the stress of transverse drawing carried out after cooling becomes small, and the unevenness of thickness in the width direction tends to be large, but by forcedly cooling a temperature of the film after cooling to be Tg+40° C. or less, it is possible to increase the stress of transverse drawing performed after cooling to reduce the unevenness of thickness in the width direction.

(5) Control of Transverse Drawing Condition

It is necessary to carry out the transverse drawing in a manner such that the draw ratio of the film becomes 3 times or more and 7 times or less at Tg+10° C. or more and Tg+40° C. or less, in a state that both edges in the width direction are held by clips in a tenter. By conducting the transverse drawing in such a predetermined condition, it becomes possible to orient molecules to the width direction to exhibit high shrinkage force in the width direction, and it becomes possible to obtain a film with good openability along perforations as a label. The temperature of transverse drawing is more preferably Tg+13° C. or more, even more preferably Tg+16° C. or more, and more preferably Tg+37° C. or less, even more preferably Tg+34° C. or less. On the other hand, the transverse drawing ratio is preferably 3.5 times or more, more preferably 4 times or more, and more preferably 6.5 times or less, even more preferably 6 times or less.

The shrinkage rate in the width direction is lowered when the drawing temperature is higher than Tg+40° C. at the time of drawing a film in the transverse direction. However, by controlling the drawing temperature to Tg+40° C. or less, it is possible to increase the shrinkage rate in the width direction. On the other hand, if the temperature of the film exceeds Tg+40° C., the drawing stress of transverse drawing becomes small and the thickness unevenness in the width direction tends to become large. By controlling the drawing temperature within a range of Tg+40° C. or less, it becomes possible to increase the stress of transverse drawing and to reduce the thickness unevenness in the width direction.

On the other hand, if the drawing temperature is less than Tg+10° C., it is not preferred because the molecular orientation to the width direction becomes excessively high, so that breakage tends to occur in transverse drawing, and further because voids inside the film are increased, so that haze of the film becomes large.

(6) Heat Treatment after Transverse Drawing (Final Heat Treatment)

It is necessary that the film after transverse drawing be finally subjected to a heat treatment over a period of 1 second or more and 9 seconds or less at a temperature of Tg or more and Tg+50° C. or less in a state that both edges in the width direction are held by clips in a tenter. If the heat treatment temperature is higher than Tg+50° C., it is not preferred because the shrinkage rate in the width direction is lowered and the heat shrinkage rate at 98° C. is less than 50%. Moreover, when the heat treatment temperature is lower than Tg, it is not preferred because the film cannot be relaxed sufficiently in the width direction and the degree of shrinkage in the width direction (the so-called natural shrinkage) is increased with the lapse of time at the time of allowing a final product to be stored under ordinary temperature condition. In addition, although a longer heat treatment time is more preferred, the facilities are made more gigantic when the treatment time is too long, and therefore it is preferred that the treatment time be set to 9 seconds or less.

(7) Relaxation Process in Longitudinal Direction

For lowering the shrinkage rate in the longitudinal direction, it is preferable to thermally relax the molecules oriented in the longitudinal direction by lengthwise drawing. When the residual shrinkage stress in the longitudinal direction of the film after lengthwise drawing is large, there is a drawback that the hot-water heat shrinkage rate in the longitudinal direction of the film after transverse drawing increases to thereby deteriorate the shrink finish. Although heat treatment in the transverse drawing process is effective to lower the hot-water heat shrinkage rate in the longitudinal direction of the film, the relaxation by heat alone increases crystals in the film, so that it is not suitable to make the shrinkage rate in the width direction higher.

As the result of studies, the present inventors have found that drawing in the longitudinal direction and then relaxing in the longitudinal direction is one of the effective means of making the shrinkage rate in the width direction higher and lowering the shrinkage rate in the longitudinal direction. Then, the present inventors have found that a film can be controlled by relaxing it in the longitudinal direction according to the means shown below. It is desired that any two of the following processes (i) to (iii), or all the three processes are carried out.

(i) A process of heating a film after lengthwise drawing at a temperature of Tg or more and Tg+60° C. or less and subjecting the film to relaxation of 10% or more and 50% or less in the longitudinal direction over a period of 0.05 seconds or more and 5 seconds or less using rolls having a speed difference therebetween. As a heating means, there can be used any of a temperature conditioning roll, near infrared rays, far infrared rays, a hot-air heater and the like.

(ii) A process of subjecting a film to relaxation of 21% or more and 40% or less in the longitudinal direction over a period of 0.1 seconds or more and 12 seconds or less by reducing the distance between clips for grasping opposite to each other in a tenter in the intermediate heat treatment process.

(iii) A process of subjecting a film to relaxation of 21% or more and 40% or less in the longitudinal direction over a period of 0.1 seconds or more and 9 seconds or less by reducing the distance between clips for grasping opposite to each other in a tenter in the final heat treatment process.

Hereinafter, each of the processes will be described.

(i) Relaxation after Lengthwise Drawing

It is desirable to heat a film after lengthwise drawing at a temperature of Tg or more and Tg+60° C. or less and subject the film to relaxation of 10% or more and 50% or less in the longitudinal direction over a period of 0.05 seconds or more and 5.0 seconds or less using rolls having a speed difference therebetween. When the temperature is lower than Tg, it is not preferred because the film after lengthwise drawing is not allowed to shrink and relaxation cannot be performed. In contrast, when the temperature is higher than Tg+60° C., it is not preferred because crystallization occurs in the film and the transparency and the like become poor. The film temperature at the time of relaxation is more preferably Tg+10° C. or more and Tg+55° C. or less, and even more preferably Tg+20° C. or more and Tg+50° C. or less.

Moreover, the time for performing relaxation in the longitudinal direction of the film after lengthwise drawing is preferably 0.05 seconds or more and 5 seconds or less. When the time is less than 0.05 seconds, it is not preferred because the irregularity in relaxation is generated unless the temperature is higher than Tg+60° C. since the time for relaxation becomes short. Further, although the film has no problem as a film when the time for relaxation is longer than 5 seconds since relaxation can be performed at low temperatures, it is preferred to appropriately adjust the process by the modification of the temperature and the time since the facilities are made more gigantic. The relaxation time is more preferably 0.1 seconds or more and 4.5 seconds or less, and even more preferably 0.5 seconds or more and 4 seconds or less.

If the relaxation ratio in the longitudinal direction of the film after lengthwise drawing is less than 10%, it is not preferred because the molecular orientation in the longitudinal direction is not sufficiently relaxed. When the relaxation rate in the longitudinal direction of the film after lengthwise drawing exceeds 50%, it is not preferred because the right-angled tearing strength in the longitudinal direction is increased and the tensile breaking strength in the longitudinal direction is decreased. The relaxation rate of the film after lengthwise drawing is more preferably 15% or more and 45% or less, and even more preferably 20% or more and 40% or less.

Examples of a method for allowing a film after lengthwise drawing to relax include a method of heating a film, after lengthwise drawing, with a heating apparatus (heating furnace) arranged between rolls and performing relaxation by taking advantage of the speed difference between the rolls; a method of heating a film, after lengthwise drawing, with a heating apparatus (heating furnace) arranged between a roll and a transverse drawing machine and allowing the speed of the transverse drawing machine to be lower than that of the roll, and the like. As the heating apparatus (heating furnace), any of a temperature conditioning roll, a near infrared ray heater, a far infrared ray heater, a hot-air heater, and the like can be used.

(ii) Relaxation in Intermediate Heat Treatment Process

In the intermediate heat treatment process, it is desirable to subject a film to relaxation of 21% or more and 40% or less in the longitudinal direction over a period of 0.1 seconds or more and 12 seconds or less by reducing the distance between clips for grasping opposite to each other in a tenter. When the relaxation rate is less than 21%, it is not preferred because the molecular orientation in the longitudinal direction is not sufficiently relaxed. When the relaxation rate exceeds 40%, it is not preferred because the right-angled tearing strength in the longitudinal direction is increased and the tensile breaking strength in the longitudinal direction is decreased. The relaxation rate is more preferably 22% or more, and more preferably 38% or less, even more preferably 36% or less.

Moreover, the time for performing relaxation in the longitudinal direction in the intermediate heat treatment process is preferably 0.1 seconds or more and 12 seconds or less. When the time is shorter than 0.1 seconds, it is not preferred because the irregularity in relaxation is generated unless the temperature is made higher than Tg+60° C. since the time for relaxation becomes short. In addition, although the film has no problem as a film when the relaxation time is longer than 12 seconds, it is preferred to appropriately adjust the process by the modification of the temperature and the time since the facilities are made more gigantic. The relaxation time is more preferably 0.3 seconds or more and 11 seconds or less, and even more preferably 0.5 seconds or more and 10 seconds or less.

(iii) Relaxation in Final Heat Treatment Process

In the final heat treatment process, it is desirable to subject a film to relaxation of 21% or more and 40% or less in the longitudinal direction over a period of 0.1 seconds or more and 9 seconds or less by reducing the distance between clips for grasping opposite to each other in a tenter. When the relaxation rate is less than 21%, it is not preferred because the molecular orientation in the longitudinal direction is not sufficiently relaxed. When the relaxation rate exceeds 40%, it is not preferred because the right-angled tearing strength in the longitudinal direction is increased and the tensile breaking strength in the longitudinal direction is decreased. The relaxation rate is more preferably 22% or more and more preferably 38% or less, even more preferably 36% or less.

Moreover, the time for performing relaxation in the longitudinal direction in the final heat treatment process is preferably 0.1 seconds or more and 9 seconds or less. When the time is less than 0.1 seconds, it is not preferred because the irregularity in relaxation is generated unless the temperature is made higher than Tg+50° C. since the time for relaxation becomes short. In addition, although the film has no problem as a film when the relaxation time is longer than 9 seconds, it is preferred to appropriately adjust the process by the modification of the temperature and the time since the facilities are made more gigantic. The relaxation time is more preferably 0.3 seconds or more and 8 seconds or less, and even more preferably 0.5 seconds or more and 7 seconds or less.

In the second invention of the present application, the undrawn film obtained by the above-mentioned method is drawn in the width direction under predetermined conditions as described later; the film after transverse drawing is heat-treated, then quenched; the film is drawn in the longitudinal direction under predetermined conditions and then subjected to heat treatment again, thereby to be able to obtain a heat-shrinkable polyester film of the second invention of the present application. Hereinafter, a preferred film-forming method for obtaining the heat-shrinkable polyester film of the second invention of the present application will be described in detail while considering differences from the conventional method of forming a heat-shrinkable polyester film.

[Film Forming Method of Heat-Shrinkable Polyester Film of Second Invention of Present Application]

As described above, the heat-shrinkable polyester film is usually produced by drawing an undrawn film only in the desired direction to be shrunk (that is, in the main shrinking direction, i.e. in the longitudinal direction in the second invention of the present application). As the result of investigations made by the present inventors on the conventional manufacturing method, it turned out that there are the following problems in producing the conventional heat-shrinkable polyester film.

In the case of simply drawing the film in the longitudinal direction, as described above, mechanical strength in the width direction becomes small, and openability along perforations as a label becomes poor. In addition, it is difficult to widen the product collection width in the film forming apparatus, and productivity is poor.

Moreover, in the case of simply drawing in the longitudinal direction, as described above, it follows that the shrinkage stress and the shrinkage speed in the longitudinal direction conflict with each other, and the finishing properties at the time of allowing the film as a label for a bottle for beverage or the like to shrink and the slack (followability) of the label with which a bottle is covered after allowed to shrink are insufficient.

In the case of adopting a method of drawing in the width direction after drawing in the longitudinal direction, any use of drawing conditions cannot sufficiently exhibit shrinkage force in the longitudinal direction. Furthermore, shrinkage force in the width direction is exhibited at the same time, so that finishing after being shrunk and attached as a label becomes poor.

In the case of adopting a method of drawing in the longitudinal direction after drawing in the width direction, although shrinkage force in the longitudinal direction can be exhibited, shrinkage force in the width direction is exhibited at the same time, so that finishing after being shrunk and attached as a label becomes poor.

Furthermore, based on problems in the production of the foregoing conventional heat-shrinkable polyester films, the present inventors have studied further on consideration for obtaining a heat-shrinkable polyester film with good openability along perforations and high productivity of the second invention of the present application, and as a result, they have arrived at the following findings.

In order to achieve good openability along perforations as a label, it is considered that the molecules oriented in the width direction need to be left to some extent.

In order to achieve good finishing after shrinkage-attachment as a label, it is essential not to exhibit shrinkage force in the width direction, and thus it is considered that the state of tension of the molecules oriented in the width direction need to be canceled out.

It is considered that the shrinkage speed can be lowered by leaving the molecules oriented in the width direction since a change in molecular orientation in the longitudinal direction at the time of being allowed to shrink in the longitudinal direction becomes slow.

It is considered that the followability can be improved by leaving the molecules oriented in the width direction since a reduction in shrinkage stress with time, which is generated at the time of being allowed to shrink in the longitudinal direction, is suppressed.

Based on the above-mentioned findings, the present inventors have found that in order to simultaneously satisfy achieving both satisfactory shrink finish and followability and attaining the openability along perforations, it is necessary to allow "molecules not contributing to shrinkage force while being oriented in the width direction" to be present in a film and to allow the film to have an appropriate molecular orientation. Then, they have paid attention on how to carry out drawing in order for "molecules not contributing to shrinkage force while being oriented in the width direction" to be able to be present in a film and how to control it, and had a trial and error. As a result, they have reached the present invention based on the following: drawing is carried out in the longitudinal direction after drawing in the width direction, what is called, in the production of a film by a transverse-lengthwise drawing method, "molecules not contributing to shrinkage force while being oriented in the width direction" to be present in a film can be realized by conducting the following means, thereby to obtain a heat-shrinkable polyester film satisfying good finishing properties after shrinkage, good followability and good openability along perforations at the same time.

(8) Control of transverse drawing condition
(9) Intermediate heat treatment after transverse drawing
(10) Control of lengthwise drawing condition by raw material
(11) Heat treatment after lengthwise drawing Hereinafter, each of the procedures mentioned above will be sequentially described.

(8) Control of Transverse Drawing Condition

First, the film is drawn in the transverse direction (transverse drawing). The transverse drawing is carried out such that the draw ratio becomes about 3.5 times or more and 5 times or less at Tg or more and Tg+20° C., in a state that both edges of the film in the width direction are held by clips in a tenter. When the draw ratio is lower than 3.5 times, it is not preferred because thickness unevenness becomes easy to be generated and the productivity becomes poor. When the draw ratio is higher than 5 times, oriented crystallization of the film after transverse drawing progresses and it is not preferred because breakage is easily generated at a lengthwise drawing process. In this connection, before the transverse drawing, it is preferred to carry out preheating previously and it is good for preheating to be performed until the temperature of the film surface reaches a temperature of Tg to Tg+30° C.

After the transverse drawing, it is preferred that the film be passed through an intermediate zone where no positive heating operation is carried out. In the case where there is a difference in temperature between a transverse drawing zone of the first tenter and an intermediate heat treatment zone, heat (hot air itself or radiant heat) of the intermediate heat treatment zone streams into the transverse drawing zone and the temperature of the transverse drawing zone is not stabilized. Since this sometimes causes the film quality to become unstable, it is preferred that a film after transverse drawing and before an intermediate heat treatment be passed through an intermediate zone over a prescribed time and then the intermediate heat treatment be conducted. In this intermediate zone, when a strip of paper is hung down without passing a film, by shutting off an associated stream accompanied by the movement of the film and hot air from the transverse drawing zone and the intermediate heat treatment zone so as to allow the strip of paper to hang down almost completely in the vertical direction, a film with a stable quality is easily obtained. As the time required for passing the intermediate zone, a period of 1 to 5 seconds or so is sufficient. When the time is shorter than 1 second, the length of the intermediate zone becomes insufficient and the deficiency of a shutoff effect for heat is caused. Moreover, although it is preferred to make the time required for passing the intermediate zone longer, a period of 5 seconds or so is sufficient since the facilities become large when the time is too long.

(9) Intermediate Heat Treatment after Transverse Drawing

In order for "molecules not contributing to shrinkage force while being oriented in the width direction" to be present in a film, it is preferable to thermally relax the molecules oriented in the width direction, but conventionally, in biaxial drawing of a film, when a film is subjected to heat treatment at high temperature between the first-axial drawing and the second-axial drawing, the film is crystallized after heat treatment, so that the film cannot be drawn more, and this fact was the technical common knowledge in the art. However, the present inventors have had a trial and error, and as a result, a surprising fact has been found out as follows; in a transverse-lengthwise drawing method, transverse drawing is conducted in a certain constant condition, an intermediate heat treatment is conducted in a predetermined condition with adjusting to the state of the film after the transverse drawing, and furthermore, with adjusting to the state of the film after the intermediate heat treatment, lengthwise drawing is conducted in a predetermined condition, thereby to be able to make "molecules not contributing to shrinkage force while being oriented in the width direction" present in the film without causing breakage in the lengthwise drawing.

The temperature of the intermediate heat treatment is more preferably Tg+43° C. or more, even more preferably Tg+46° C. or more, and more preferably Tg+67° C. or less, even more preferably Tg+64° C. or less. On the other hand, it is necessary that the treatment time for the intermediate heat treatment be appropriately adjusted within a range of 5 seconds or more and 15 seconds or less depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately adjust the process by the modification of the temperature and the treatment time.

By setting the temperature of the intermediate heat treatment to Tg+40° C. or more, the degree of molecular orientation in the width direction can be increased and it is therefore possible to maintain the tensile breaking strength in the width direction high while maintaining the right-angled tearing strength low. In contrast, by controlling the temperature of the intermediate heat treatment within a range of Tg+70° C. or less, it is possible to suppress the crystallization of the film to maintain the drawability in the width direction and to suppress troubles caused by breakage. Moreover, it is possible to suppress the crystallization of the surface layer of the film to maintain the solvent adhesive strength high, and furthermore, it is also possible to reduce the thickness unevenness in the width direction. In this way, a film uniaxially drawn in the transverse direction is obtained.

A relaxation may be conducted at the intermediate heat treatment, but when a relaxation rate is beyond 40%, the degree of molecular orientation becomes low, and the tensile breaking strength in the width direction becomes low, therefore, the relaxation ratio is preferably 40% or less.

(10) Control of Lengthwise Drawing Condition by Raw Material

For allowing a film to exhibit the lengthwise shrinkage, lengthwise drawing has been used. In general, as the lengthwise shrinkage rate is heightened, the shrinkage stress in the lengthwise direction is also heightened. In order to lower the shrinkage stress in the lengthwise direction, it is necessary to allow the drawing stress at the time of lengthwise drawing to be lowered. And then, as a means of allowing the lengthwise drawing stress to be lowered, although there is a method of lowering the lengthwise draw ratio, it is not preferred because when the lengthwise draw ratio is lowered, the shrinkage rate to be exhibited is also lowered due to the relationship of material balance.

Then, as a method of decreasing only the lengthwise drawing stress while maintaining the lengthwise shrinkage rate high by increasing the lengthwise draw ratio, the present inventors paid attention to diethylene glycol as described above. By adding the diethylene glycol in a predetermined amount, the increase in drawing stress was small even when the draw ratio was increased by lengthwise drawing, and the shrinkage stress in the longitudinal direction could be decreased.

With regard to specific lengthwise drawing conditions, it is preferred that a film after the intermediate heat treatment be introduced to a lengthwise drawing machine in which a plurality of rolls are continuously disposed, be preheated on a preheating roll until the film temperature reaches a temperature of Tg to Tg+20° C., and then, heated by means of an infrared heater or the like so that the film temperature reaches a temperature of Tg+10° C. to Tg+60° C. to subject the film to lengthwise drawing so that the draw ratio becomes 2.5 to 5 times. As the lengthwise drawing roll, a heating roll may be used.

When the temperature in lengthwise drawing is lower than Tg+15° C., it is not preferred because the drawing stress at the time of lengthwise drawing becomes high and the shrinkage stress in the longitudinal direction becomes high. The lengthwise drawing temperature is preferably Tg+20° C. or more and even more preferably Tg+25° C. or more. It is considered that the upper limit of the lengthwise drawing temperature is Tg+60° C. so that a film is prevented from adhering to a roll. Moreover, the lengthwise draw ratio is preferably 2.7 times or more and 4.8 times or less and is even more preferably 2.8 times or more and 4.6 times or less.

(11) Heat Treatment after Lengthwise Drawing

It is necessary that the film after lengthwise drawing is finally subjected to a heat treatment over a period of 5 to 10 seconds at a temperature of Tg° C. or more and Tg+40° C. or less in a state that both edges in the film width direction are held by clips in a tenter (second tenter). The relaxation (slackening) in the width direction may be arbitrarily conducted simultaneously with this heat treatment. In the case of performing a relaxation, the relaxation rate is preferably 0% or more and 30% or less. When the relaxation rate in the width direction exceeds 30%, the molecular orientation in the film width direction decreases and the right-angled tearing strength and the tensile breaking strength in the width direction are unfavorably lowered. The relaxation rate in the width direction is more preferably 27% or less and even more preferably 24% or less.

When the heat treatment temperature is higher than Tg+40° C., it is not preferred because the shrinkage rate in the longitudinal direction is lowered and the heat shrinkage rate in the longitudinal direction at 98° C. becomes less than 40%. Moreover, when the heat treatment temperature is lower than Tg, it is not preferred because the thermal relaxation of the molecular orientation in the longitudinal direction is not sufficiently performed and the degree of shrinkage in the longitudinal direction (the so-called natural shrinkage) is increased with the lapse of time at the time of allowing a final product to be stored under ordinary temperature condition. Moreover, although it is preferred that the heat treatment time be set to as long as possible, the facilities are made more gigantic when the treatment time is too long, and therefore, it is preferred that the treatment time be set to 10 seconds or less.

The package of the present invention is a package in which a label provided with perforations or a notch using the foregoing heat-shrinkable polyester film of the present invention is covered at least on a part of the outer periphery of an object to be packaged and then shrunk by heating. Examples of packaging objects include PET bottles for beverages, various bottles, cans, plastic containers for confections and box lunches, paper boxes, and the like. In general, in the case where a label using a heat-shrinkable polyester film is covered on the packaging object and heat-shrunk, the label is heat-shrunk by about 5 to 70% and closely attached on the package. Additionally, a label covered on a packaging object may be printed or may not be printed.

A method for producing a label is as follows: an organic solvent is applied on the inside slightly apart from the end part of one surface of a rectangular film and the film is immediately rounded to stack the end parts and bonded into a label-form, or an organic solvent is applied on the inside slightly apart from the end part of one surface of a film wound as a roll and the film is immediately rounded to stack the end parts and bonded into a tube-form, which is then cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention is specifically described by way of Examples and Comparative Examples, but the present invention is by no means limited to aspects of these Examples, and it can be suitably modified in the range not departing from the scope of the present invention. Evaluation methods of films are shown as follows.

[Heat Shrinkage Rate (Hot-Water Shrinkage Rate)]

A heat-shrinkable film was cut into a square of 10 cm×10 cm, immersed in hot water at 98° C.±0.5° C. for 10 seconds in a no-load state and thermally shrunk, then immersed in water at 25° C.±0.5° C. for 10 seconds, and the film was drawn out from water to measure the longitudinal and transverse dimensions of the film. Each heat shrinkage rate was determined according to the following equation (1). The direction with the larger heat shrinkage rate was defined as a main shrinking direction.

Heat shrinkage rate={(Length before shrinkage−Length after shrinkage)/Length before shrinkage}×100%   Equation (1)

[Shrinkage Stress and Shrinkage Stress Ratio]

A sample of 200 mm in length in the main shrinking direction and 20 mm in width was cut out of a heat-shrinkable film and measured for the shrinkage stress using a strong elongation measuring machine with a heating furnace, a TENSILON universal testing machine PTM-250 (registered trademark of ORIENTEC Co., LTD)) (formerly Toyo Baldwin Corporation). The heating furnace of the strong elongation measuring machine was previously heated to 90° C., and the distance between chucks for gripping the film sample was set to 100 mm. When attaching the sample to the chuck of the strong elongation measuring machine, the blowing of the heating furnace was once stopped to open the door of the heating furnace, then each 25 mm of both ends of the sample of 150 mm in length was sandwiched between the chucks and fixed without looseness with the distance between the chucks being 100 mm, so that the distance between chucks coincided with the length direction of the sample and the sample was horizontal. After attaching the sample to the chuck, the door of the heating furnace was quickly closed to restart the air blow. The point of time when closing the door of the heating furnace and resuming the blowing was defined as the point of starting measurement of the shrinkage stress, and the shrinkage stress (MPa) after 30 seconds was determined. Further, the maximum value of the shrinkage stress measurement values from the measurement start time point of the shrinkage stress to 30 seconds after the start of the measurement was defined as the maximum value of the shrinkage stress (maximum shrinkage stress (MPa)). In the measurement of shrinkage stress, the distance between the chucks was fixed at 100 mm and the transition of shrinkage stress from the start of measurement to 30 seconds after the start of measurement was measured. Then, the ratio of the value of the shrinkage stress 30 seconds after the start of the measurement to the maximum value of the shrinkage stress was taken as the shrinkage stress ratio (expressed by the following equation).

Shrinkage stress ratio (%)=(Value of shrinkage stress after 30 seconds)÷(Maximum value of shrinkage stress)×100

[Tensile Breaking Strength]

A test specimen with a strip-like shape of 140 mm in the measurement direction (the longitudinal direction or the width direction of the film) and 20 mm in a direction perpendicular to the measurement direction (the width direction or the longitudinal direction of the film) was prepared. Using a universal tensile testing machine "DSS-100" (manufactured by SHIMADZU CORPORATION), each of 20 mm grasping margins located at both ends of the test specimen was fixed to a chuck (the distance of 100 mm between chucks), and the tensile test was performed under the conditions of an atmospheric temperature of 23° C. and a tensile speed of 200 mm/minute, and the strength (stress) at the time of being torn and broken was defined as the tensile breaking strength.

[Right-Angled Tearing Strength]

A film in a state of being previously slackened was mounted to a rectangular frame having a prescribed length (that is, both ends of the film were allowed to be grasped by the frame). Then, by immersing the film in hot water at 80° C. for about 5 seconds until the slackened film became a tensioned state within the frame (until the slack was eliminated), the film was shrunk by 10% in the main shrinking direction (width direction or longitudinal direction). In accordance with JIS K7128-3, a test specimen with a shape shown in the figure was cut out of this film which had been allowed to shrink by 10%. In the figure the unit of length is mm, and R represents the radius. In this connection, at the time of cutting out the test specimen, the direction (longitudinal direction or width direction) perpendicular to the main shrinking direction of the film was made to be the tearing direction. Next, both ends (in the width direction) of the test specimen were made to be grasped with a universal tensile testing machine ("Autograph" manufactured by SHIMADZU CORPORATION), the tensile test was performed under the condition of a tensile speed of 200 mm/minute, and a maximum load at the time of being completely torn apart in a direction perpendicular to the main shrinking direction (longitudinal direction or width direction) of the film was measured. By dividing the maximum load by the thickness of the film, a right-angled tearing strength per unit thickness was calculated.

[Hazes]

Haze was measured using a haze meter (manufactured by NIHON SEIMITSU KIKAI KOSAKU CO., LTD.) according to JIS K7136.

[Tg (Glass Transition Point)]

Using a differential scanning calorimeter (model: DSC220, manufactured by Seiko Instruments Inc.), 5 mg of an undrawn film was heated at a temperature rising rate of 10° C./min from −40° C. to 120° C., and Tg was determined from the thus obtained endothermic curve. The temperature at the intersection of the extension line of the baseline below the glass transition temperature and the tangent line showing the maximum inclination at the transition portion was defined as the glass transition temperature (Tg).

[Shrinkage Strain of Label]

A heat-shrinkable film was previously subjected to three-color printing with respective inks of grass green color, gold color and white color available from TOYO INK CO., LTD. By adhering both end portions of the printed heat shrinkable film with dioxolane, a cylindrical label (a label with the main shrinking direction of the heat shrinkable film as the peripheral direction) was prepared and cut. The diameter in the shrinking direction of the label was 35 cm, and the non-shrinking direction (height direction of the container) was 4 cm. The label was placed on a thin polyethylene container with a side of 20 cm square and a height of 6 cm, and passed through a steam tunnel (model: SH-1500-L) manufactured by Fuji Astec Inc. at a zone temperature of 90° C. in 3 seconds, so that the label was shrunk by heat and mounted to the bottle. For evaluating finishing properties after shrinkage, the strain in the direction of 360 degrees at the upper part of the mounted label was measured using a gauge and the maximum value of the strain was determined. The finishing properties were evaluated according to the following criteria.

(Evaluation Criteria in Table 3)
⊙: Maximum strain less than 3.0 mm
○: Maximum strain 3.0 mm or more and less than 4.0 mm
×: Maximum strain 4.0 mm or more
(Evaluation Criteria in Table 5)
○: Maximum strain less than 3.0 mm
×: Maximum strain 3.0 mm or more

[Height of Label]

The height of the label as described above was measured and the results were evaluated according to the following criteria.

(Evaluation Criteria in Table 3)
⊙: The height of the label is 38 mm or more.
○: The height of the label is 36 mm or more and less than 38 mm.
×: The height of the label is less than 36 mm.
(Evaluation Criteria in Table 5)
○: The height of the label is 38 mm or more.
×: The height of the label is less than 38 mm.

[Insufficient Shrinking of Label]

The shrinking state of the label was evaluated according to the following criteria.
○: There is no slack between the mounted label and the container, and the label is shrunk.
×: There is a slack between the label and the container due to insufficient shrinking.

[Wrinkles of Label]

Under the same conditions as those for the shrinkage strain of the label mentioned above, the occurrence state of wrinkles was evaluated according to the following criteria.
⊙: The number of wrinkles with a size of 2 mm or more is zero.
○: The number of wrinkles with a size of 2 mm or more is 1 or more and 2 or less.
×: The number of wrinkles with a size of 2 mm or more is 3 or more.

[Deformation of Container]

Under the same conditions as those for the shrinkage strain of the label mentioned above, the occurrence state of the container deformation was evaluated according to the following criteria.

○: Deformation of the container is less than 2 mm.
×: Deformation of the container is 2 mm or more.

[Openability Along Perforations]

A label to which perforations were previously provided in a direction perpendicular to the main shrinking direction was attached on a container in the same condition as in the foregoing measuring condition of shrinkage strain. The perforation was formed by providing a hole of 1 mm long in the intervals of 1 mm, and two lines of perforations were provided in width 22 mm and length 40 mm in the lengthwise direction (height direction) of the label. Thereafter, the perforations of the label were torn with fingertips, and the number of the labels cleanly not torn along the perforations in the lengthwise direction or not able to be removed from the bottle was counted. Then, the defective rate (%) of perforation opening per 50 samples of all samples was calculated. If the defective rate of perforation opening is 20% or less, it is acceptable for practical use.

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that ethylene glycol became 2.2 times to dimethyl terephthalate in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto and polycondensation reaction was carried out at 280° C. under a reduced pressure of 26.6 Pa (0.2 torr) to obtain a polyester (A) having an intrinsic viscosity of 0.70 dl/g. This polyester is a polyethylene terephthalate. In the production of the polyester (A), $SiO_2$(SYLYSIA 266 manufactured by FUJI SILYSIA CHEMICAL LTD.) was added as a lubricant in a ratio of 8000 ppm based on the polyester. Polyesters (A, B, C, D, E and F) shown in Table 1 were synthesized by the similar process as described above. In the Table, IPA is isophthalic acid, DEG is diethylene glycol, NPG is neopentyl glycol, and CHDM is 1,4-cyclohexanedimethanol. The intrinsic viscosities of the polyesters A, B, C, D, E and F were 0.68 dl/g, 0.68 dl/g, 0.72 dl/g, 0.72 dl/g, 0.70 dl/g and 0.72 dl/g, respectively. Each polyester was appropriately formed into a chip.

The compositions of the polyester raw materials used in Examples and Comparative Examples, and the resin compositions and production conditions of the films in Examples and Comparative Examples are shown in Tables 1 and 2, respectively.

TABLE 1

| | Composition of raw material polyester (mol %) | | | | | | |
|---|---|---|---|---|---|---|---|
| | Dicarboxylic acid component | | Polyvalent alcohol component | | | | Added amount of lubricant |
| | DMT | IPA | EG | DEG | NPG | CHDM | (ppm) |
| Polyester A | 100 | — | 60 | 40 | — | — | 8000 |
| Polyester B | 100 | — | 60 | 40 | — | — | 0 |
| Polyester C | 100 | — | 60 | 3 | 37 | — | 0 |
| Polyester D | 100 | — | 60 | 3 | — | 37 | 0 |
| Polyester E | 100 | — | 100 | — | — | — | 0 |
| Polyester F | 90 | 10 | 60 | 10 | 30 | — | 0 |

TABLE 2

| | Composition of resin | Amount of amorphous component (mol %) | Amount of DEG (mol %) | Tg of raw material (° C.) | Lengthwise drawing | | Relaxation process in the longitudinal direction | | | |
|---|---|---|---|---|---|---|---|---|---|---|
| | | | | | Drawing conditions | | After lengthwise drawing | | Relaxation rate in the intermediate heat treatment process (%) | Relaxation rate in final heat treatment process (%) |
| | | | | | Temperature (° C.) | Ratio | Heating furnace temperature (° C.) | Relaxation rate (%) | | |
| Example 1 | A/B/C = 5:25:70 | 25.9 | 14.1 | 65 | 75 | 4 | 95 | 30 | 28.6 | 0 |
| Example 2 | A/B/D = 5:25:70 | 25.9 | 14.1 | 65 | 75 | 4 | 95 | 30 | 28.6 | 0 |
| Example 3 | A/B/C = 5:35:60 | 22.2 | 17.8 | 65 | 75 | 4 | 95 | 30 | 28.6 | 0 |
| Example 4 | A/B/F = 5:25:70 | 28 | 19 | 63 | 75 | 4 | 93 | 30 | 28.6 | 0 |
| Example 5 | A/B/C/E = 5:12:70:13 | 25.9 | 8.9 | 67 | 75 | 4 | 95 | 30 | 28.6 | 0 |
| Example 6 | A/B/C = 5:25:70 | 25.9 | 14.1 | 65 | 75 | 4 | 95 | 30 | 0 | 28.6 |
| Example 7 | A/B/C/E = 5:25:60:10 | 22.2 | 13.8 | 66 | 75 | 4 | 95 | 30 | 28.6 | 0 |
| Comparative Example 1 | A/B/C = 5:25:70 | 25.9 | 14.1 | 65 | | | No lengthwise drawing | | | |
| Comparative Example 2 | A/C/E = 5:70:25 | 25.9 | 4.1 | 72 | 82 | 4 | 95 | 30 | 28.6 | 0 |

| | Intermediate heat treatment process | | Presence of intermediate zone | Temperature of cooling process (° C.) | Transverse drawing | | Final heat treatment temperature (° C.) |
|---|---|---|---|---|---|---|---|
| | Temperature (° C.) | Time (second) | | | Drawing temperature (° C.) | Ratio | |
| Example 1 | 123 | 8 | Present | 95 | 90 | 5 | 91 |
| Example 2 | 123 | 8 | Present | 95 | 90 | 5 | 91 |
| Example 3 | 123 | 8 | Present | 95 | 90 | 5 | 91 |
| Example 4 | 123 | 8 | Present | 95 | 90 | 5 | 91 |
| Example 5 | 123 | 8 | Present | 95 | 90 | 5 | 91 |
| Example 6 | 123 | 8 | Present | 95 | 90 | 5 | 91 |

TABLE 2-continued

| | | | | | | | |
|---|---|---|---|---|---|---|---|
| Example 7 | 123 | 8 | Present | 95 | 90 | 5 | 91 |
| Comparative Example 1 | 100 | 8 | Present | 95 | 70 | 5 | 80 |
| Comparative Example 2 | 130 | 8 | Present | 100 | 95 | 5 | 96 |

(Examples and Comparative Examples of First Invention of Present Application)

Example 1

The above-described polyester A, polyester B, and polyester C were mixed in a mass ratio of 5:25:70, and charged into an extruder. Thereafter, the mixed resin was melted at 260° C., extruded from a T-die, and quenched by winding it on a rotating metal roll cooled to a surface temperature of 30° C., thereby to obtain an undrawn film of 228 μm thickness. At that time, the take-off speed of the undrawn film (rotating speed of the metal roll) was about 20 m/min. Moreover, Tg of the undrawn film was 65° C.

The obtained undrawn film was guided to a longitudinally drawing machine in which a plurality of roll groups was continuously arranged and drawn 4 times in the longitudinal direction at 75° C. by utilizing the difference in rotational speed between rolls.

The film immediately after the lengthwise drawing was passed through a heating furnace. The inside of the heating furnace was heated by means of a hot-air heater, and the set temperature was 95° C. By taking advantage of the speed difference between a roll at the inlet side and a roll at the outlet side of the heating furnace, the film was relaxed by 30% in the longitudinal direction. The time for relaxation treatment was 0.6 seconds.

The film after the relaxation treatment was introduced to a transverse drawing machine (tenter) and made to pass sequentially through an intermediate heat treatment zone, an intermediate zone (natural cooling zone), a cooling zone (forced cooling zone), a transverse drawing zone, and a final heat treatment zone. In the intermediate zone in the tenter, hot wind from the intermediate heat treatment zone and cooling wind from the cooling zone were shut off such that when a rectangular strip of paper is hung down in the vertical direction in a state that a film is not passed through, the strip of paper hangs down almost completely in the vertical direction. When a film passes through, the distance of the film and a shielding plate was adjusted such that the most part of associated air accompanied by movement of the film was shut off by the shielding plate provided between the intermediate heat treatment zone and the intermediate zone. In addition, when a film passes through, the distance of the film and a shielding plate was adjusted such that the most part of associated air accompanied by movement of the film was shut off by the shielding plate provided between the intermediate zone and the cooling zone.

The film which was subjected to relaxation after lengthwise drawing was introduced to the tenter, and was then heat-treated at 123° C. for 8 seconds in the intermediate heat treatment zone. At that time, the relaxation ratio in the longitudinal direction was 28.6%. Next, the film after the intermediate heat treatment was introduced to the intermediate zone, and was naturally cooled by passing through the intermediate zone (passing time=about 1 second). Thereafter, the film after the natural cooling was introduced to the cooling zone, and actively cooled by blowing wind of low temperature until the surface temperature of the film became 95° C. Then, the film was drawn 5 times in the width direction (transverse direction) at 90° C.

The film after the transverse drawing was guided to the final heat treatment zone and heat-treated at 91° C. for 5 seconds in the final heat treatment zone. Thereafter, the film was cooled, and both edges of the film were cut off. Then, the film was wound into a roll with a width of 500 mm to continuously produce a biaxially drawn film having a thickness of 20 μm over a predetermined length. The properties of the obtained film were evaluated by the above-described method.

Example 2

A film with a thickness of 20 μm was produced in the same manner as in Example 1 except that the polyester C was changed to polyester D. The evaluation results are shown in Table 3.

Example 3

A film with a thickness of 20 μm was produced in the same manner as in Example 1 except that polyester A, polyester B, and polyester C were mixed in a mass ratio of 5:35:60. The Tg of the undrawn film was 65° C. The evaluation results are shown in Table 3.

Example 4

A film with a thickness of 20 μm was produced in the same manner as in Example 1 except that polyester A, polyester B, and polyester F were mixed in a mass ratio of 5:25:70. The Tg of the undrawn film was 63° C. The evaluation results are shown in Table 3.

Example 5

A film with a thickness of 20 μm was produced in the same manner as in Example 1 except that polyester A, polyester B, polyester C, and polyester E were mixed in a mass ratio of 5:12:70:13. The Tg of the undrawn film was 67° C. The evaluation results are shown in Table 3.

Example 6

A film having a thickness of 20 μm was produced in the same manner as in Example 1 except that the relaxation in the longitudinal direction was changed to perform in the final heat treatment process in place of in the intermediate heat treatment process. The evaluation results are shown in Table 3.

Example 7

A film with a thickness of 20 μm was produced in the same manner as in Example 1 except that polyester A, polyester B, polyester C, and polyester E were mixed in a mass ratio of 5:25:60:10. The Tg of the undrawn film was 66° C. The evaluation results are shown in Table 3.

Comparative Example 1

A film with a thickness of 20 μm was produced in the same manner as in Example 1 except that the thickness of the undrawn film was set to 100 μm, the lengthwise drawing and the relaxation in the longitudinal direction were not performed, the temperature of the intermediate heat treatment zone was set to 100° C., the temperature at the time of the transverse drawing was set to 70° C., and the temperature of the final heat treatment was set to 80° C. The evaluation results are shown in Table 3. The stress ratio of the film was small and the difference between the maximum shrinkage stress and the shrinkage stress after 30 seconds was large.

Comparative Example 2

The above mixing was changed to a mixing of polyester A, polyester C, and polyester E in a mass ratio of 5:70:25. A film having a thickness of 20 μm was produced in the same manner as in Example 1 except that the lengthwise drawing temperature was 72° C., the intermediate heat treatment process temperature was 130° C., the cooling process temperature was 100° C., the transverse drawing temperature was 95° C., and the final heat treatment temperature was 96° C. The Tg of the undrawn film was 72° C. The evaluation results are shown in Table 3. The shrinkage stress in the width direction was high and deformation of the container occurred.

TABLE 3

|  | Thickness (μm) | Hot-water heat shrinkage rate (%) 98° C. | | Shrinkage stress in the width direction (MPa) | | Stress ratio (%) | Right-angled tearing strength (N/mm) | Tensile breaking strength (MPa) |
|---|---|---|---|---|---|---|---|---|
|  |  | Longitudinal direction | Width direction | Maximum stress | Stress after 30 seconds |  |  | Longitudinal direction |
| Example 1 | 20 | 1 | 75 | 3.5 | 3.4 | 97 | 300 | 125 |
| Example 2 | 20 | 2 | 77 | 3 | 2.9 | 97 | 330 | 110 |
| Example 3 | 20 | 3 | 71 | 3.3 | 3.2 | 97 | 295 | 127 |
| Example 4 | 20 | −2 | 80 | 2.7 | 2.6 | 96 | 320 | 110 |
| Example 5 | 20 | 6 | 70 | 6.1 | 5.8 | 95 | 280 | 135 |
| Example 6 | 20 | 0 | 73 | 3.4 | 3 | 97 | 303 | 125 |
| Example 7 | 20 | 7 | 65 | 4.6 | 4.4 | 96 | 295 | 125 |
| Comparative Example 1 | 20 | −4 | 80 | 3.1 | 1.6 | 52 | 433 | 40 |
| Comparative Example 2 | 20 | 7 | 73 | 8.5 | 8.2 | 96 | 276 | 140 |

|  | Shrinkage strain of label | Height of label | Insufficient shrinkage of label | Wrinkles of label | Deformation of container | Defective rate of perforation opening (%) |
|---|---|---|---|---|---|---|
| Example 1 | ⊙ | ⊙ | ◯ | ⊙ | ◯ | 12 |
| Example 2 | ⊙ | ⊙ | ◯ | ⊙ | ◯ | 16 |
| Example 3 | ⊙ | ⊙ | ◯ | ⊙ | ◯ | 12 |
| Example 4 | ⊙ | ⊙ | ◯ | ⊙ | ◯ | 16 |
| Example 5 | ⊙ | ⊙ | ◯ | ⊙ | ◯ | 10 |
| Example 6 | ⊙ | ⊙ | ◯ | ⊙ | ◯ | 12 |
| Example 7 | ⊙ | ⊙ | ◯ | ⊙ | ◯ | 10 |
| Comparative Example 1 | ⊙ | ⊙ | ◯ | X | ◯ | 52 |
| Comparative Example 2 | ◯ | ⊙ | ◯ | ⊙ | X | 8 |

TABLE 4

|  | Composition of resin | Amount of amorphous component (mol %) | Amount of DEG (mol %) | Tg of raw material (° C.) | Transverse drawing Drawing conditions | | Intermediate heat treatment temperature (° C.) |
|---|---|---|---|---|---|---|---|
|  |  |  |  |  | Drawing temperature (° C.) | Ratio |  |
| Example 8 | A/B/C = 5:25:70 | 25.9 | 14.1 | 65 | 75 | 4 | 123 |
| Example 9 | A/B/D = 5:25:70 | 25.9 | 14.1 | 65 | 75 | 4 | 123 |
| Example 10 | A/B/C = 5:45:50 | 18.5 | 21.5 | 62 | 72 | 4 | 120 |
| Example 11 | A/B/F = 5:25:70 | 28 | 19 | 63 | 73 | 4 | 121 |
| Example 12 | A/B/C/E = 5:5:70:20 | 25.9 | 6.1 | 68 | 78 | 4 | 126 |

TABLE 4-continued

| | | | | | | | |
|---|---|---|---|---|---|---|---|
| Example 13 | A/B/C = 5:15:80 | 29.6 | 10.4 | 66 | 76 | 4 | 124 |
| Example 14 | A/B/C = 5:25:70 | 25.9 | 14.1 | 65 | 75 | 4 | 123 |
| Comparative Example 3 | A/B/C = 5:25:70 | 25.9 | 14.1 | 65 | No transverse drawing | | |
| Comparative Example 4 | A/C/E = 5:73:22 | 27 | 4.2 | 72 | 82 | 4 | 130 |

| | Transverse drawing Drawing conditions | Lengthwise drawing process Drawing conditions | | Final heat treatment process Heat | |
|---|---|---|---|---|---|
| | Relaxation rate (%) | Drawing temperature (° C.) | Ratio | treatment temperature (° C.) | Relaxation rate (%) |
| Example 8 | 10 | 88 | 3.5 | 78 | 8 |
| Example 9 | 10 | 88 | 3.5 | 78 | 8 |
| Example 10 | 10 | 85 | 3.5 | 75 | 8 |
| Example 11 | 10 | 86 | 3.5 | 76 | 8 |
| Example 12 | 10 | 91 | 3.5 | 81 | 8 |
| Example 13 | 15.5 | 89 | 4 | 79 | 0 |
| Example 14 | 10 | 88 | 3.5 | 98 | 8 |
| Comparative Example 3 | No transverse drawing | 88 | 3.5 | No final heat treatment | |
| Comparative Example 4 | 10 | 95 | 3.5 | 85 | 8 |

(Examples and Comparative Examples of Second Invention of Present Application)

Example 8

The above-described polyester A, polyester B, and polyester C were mixed in a mass ratio of 5:25:70, and charged into an extruder. Thereafter, the mixed resin was melted at 260° C. and extruded from a T-die, and quenched by winding it on a cooled rotating metal roll set to a surface temperature of 30° C., thereby to obtain an undrawn film of 209 μm thickness. At that time, the take-off speed of the undrawn film (rotating speed of the metal roll) was about 20 m/min. Moreover, Tg of the undrawn film was 65° C.

The obtained undrawn film was guided to a tenter (first tenter) in which a transverse drawing zone, an intermediate zone, and an intermediate heat treatment zone were continuously provided. In the intermediate zone, a hot-air stream from the drawing zone and a hot-air stream from the heat treatment zone were blocked such that when a paper piece of a strip hanged in a state without passing the film, the paper piece hanged almost completely in the vertical direction.

Then, the undrawn film guided to the tenter was preliminarily heated until the film temperature reached Tg+15° C., drawn 4 times in the transverse direction at Tg+10° C. in the transverse drawing zone, passed through the intermediate zone (passing time=about 1.2 seconds), guided to the intermediate heat treatment zone, and heat treated at Tg+58° C. for 8 seconds. A transverse uniaxially drawn film having a thickness of 58 μm was obtained by relaxing by 10% in the transverse direction at the same time.

Further, the transversely drawn film was guided to a longitudinally drawing machine in which a plurality of roll groups was continuously arranged, preheated on the preheating roll until the film temperature reached Tg+15° C., and then the film temperature was raised to Tg+23° C. by an infrared ray heater, and after drawing 3.5 times, the film was forcibly cooled with a cooling roll set to a surface temperature of 25° C.

The cooled film was guided to a tenter (second tenter) and heat-treated for 10 seconds in an atmosphere of Tg+13° C. in the second tenter. At the same time, 8% relaxation was given in the width direction. Thereafter, the film was cooled and both edges of the film were cut off and the film was wound into a roll with a width of 500 mm to continuously produce a biaxially drawn film having a thickness of 18 μm with a predetermined length. The properties of the obtained film were evaluated by the above-described method. Evaluation results are shown in Table 5. The obtained film was a film with good cut and good shrink finish.

Example 9

A film with a thickness of 18 μm was produced in the same manner as in Example 8 except that the polyester C was changed to polyester D. The evaluation results are shown in Table 5.

Example 10

A film with a thickness of 18 μm was produced in the same manner as in Example 8 except that polyester A, polyester B, and polyester C were mixed in a mass ratio of 5:45:50. The Tg of the undrawn film was 62° C. The evaluation results are shown in Table 5.

Example 11

A film with a thickness of 18 μm was produced in the same manner as in Example 8 except that polyester A, polyester B, and polyester F were mixed in a mass ratio of 5:25:70. The Tg of the undrawn film was 63° C. The evaluation results are shown in Table 5.

Example 12

A film with a thickness of 18 μm was produced in the same manner as in Example 8 except that polyester A, polyester B, polyester C, and polyester E were mixed in a mass ratio of 5:5:70:20. The Tg of the undrawn film was 68° C. The evaluation results are shown in Table 5.

Example 13

Polyester A, polyester B, and polyester C were mixed in a mass ratio of 5:15:80, and the undrawn film had a thickness of 243 μm. In addition, the transverse relaxation rate after transverse drawing was changed to 15.5%, the longitudinal draw ratio was changed to 4 times, and the transverse relaxation rate in the final heat treatment process was changed to 0%. A film having a thickness of 18 μm was produced in the same manner as in Example 8 except for these conditions. The Tg of the undrawn film was 68° C. The evaluation results are shown in Table 5.

Example 14

A film having a thickness of 18 μm was produced in the same manner as in Example 8 except that the temperature of the final heat treatment process was changed to Tg+33° C. The evaluation results are shown in Table 5.

Comparative Example 3

With the thickness of the undrawn film being 63 μm, a film having a thickness of 18 μm was produced in the same manner as in Example 8 without performing transverse drawing and final heat treatment. The evaluation results are shown in Table 5. In this film, the stress ratio was small and the difference between the maximum shrinkage stress and the shrinkage stress after 30 seconds was large. Also, the tensile breaking strength in the width direction was low and the right-angled tearing strength was high. The label using the obtained film was a label inferior in shrink finish and perforation opening ratio as compared with the label of Example.

Comparative Example 4

A film having a thickness of 18 μm was produced in the same manner as in Example 8 except that polyester A, polyester C, and polyester E were mixed at a mass ratio of 5:73:22. The Tg of the film was 72° C. The evaluation results are shown in Table 5. The shrinkage stress was high, and the label using the obtained film was a label causing deformation of the container as compared with the label of Example.

TABLE 5

| | Thickness (μm) | Hot-water heat shrinkage rate (%) 98° C. | | Shrinkage stress in the longitudinal direction (MPa) | | | Right-angled tearing strength (N/mm) | Tensile breaking strength (MPa) Width direction | Haze (%) |
|---|---|---|---|---|---|---|---|---|---|
| | | Longitudinal direction | Width direction | Maximum stress | Stress after 30 seconds | Stress ratio (%) | | | |
| Example 8 | 18 | 66 | 6 | 4 | 3.7 | 93 | 260 | 140 | 6.8 |
| Example 9 | 18 | 67 | 7 | 3.8 | 3.5 | 92 | 290 | 125 | 6.5 |
| Example 10 | 18 | 62 | 6 | 2.7 | 2.7 | 100 | 300 | 120 | 7.3 |
| Example 11 | 18 | 69 | 9 | 3.3 | 3.2 | 97 | 300 | 120 | 7 |
| Example 12 | 18 | 64 | 7 | 6.6 | 6.3 | 95 | 240 | 150 | 8 |
| Example 13 | 18 | 72 | 10 | 5.5 | 5.3 | 96 | 290 | 130 | 7.4 |
| Example 14 | 18 | 48 | −1 | 2.5 | 2.5 | 100 | 270 | 135 | 8.2 |
| Comparative Example 3 | 18 | 69 | −3 | 5.6 | 2.9 | 52 | 430 | 40 | 5.5 |
| Comparative Example 4 | 18 | 62 | 6 | 8 | 7.6 | 95 | 280 | 130 | 7.5 |

| | Shrinkage strain of label | Height of label | Insufficient shrinkage of label | Wrinkles of label | Deformation of container | Defective rate of perforation opening (%) |
|---|---|---|---|---|---|---|
| Example 8 | ○ | ○ | ○ | ○ | ○ | 8 |
| Example 9 | ○ | ○ | ○ | ○ | ○ | 12 |
| Example 10 | ○ | ○ | ○ | ○ | ○ | 14 |
| Example 11 | ○ | ○ | ○ | ○ | ○ | 12 |
| Example 12 | ○ | ○ | ○ | ○ | ○ | 6 |
| Example 13 | ○ | ○ | ○ | ○ | ○ | 14 |
| Example 14 | ○ | ○ | ○ | ○ | ○ | 10 |
| Comparative Example 3 | X | ○ | ○ | ○ | ○ | 58 |
| Comparative Example 4 | ○ | ○ | ○ | ○ | X | 6 |

INDUSTRIAL APPLICABILITY

The heat-shrinkable polyester film of the present invention has a low shrinkage stress and a small stress attenuation despite having a high heat shrinkage rate, so that it can be suitably used as a label for thinned containers and the like. A package such as a container obtained by using the heat-shrinkable polyester film of the present invention as a label has a beautiful appearance.

The invention claimed is:

1. A heat-shrinkable polyester film which satisfies the following requirements (1) to (4):
   (1) the hot-water heat shrinkage rate when the film is immersed in hot water at 98° C. for 10 seconds is 40% or more and 85% or less in the main shrinking direction of the film;
   (2) the hot-water heat shrinkage rate when the film is immersed in hot water at 98° C. for 10 seconds is -5% or more and 15% or less in a direction perpendicular to the main shrinking direction of the film;
   (3) the maximum shrinkage stress is 2 MPa or more and 7 MPa or less in the main shrinking direction of the film when measured in hot air of 90° C., and the shrinkage stress 30seconds after measurement of the shrinkage stress has started is 60% or more and 100% or less of the maximum shrinkage stress; and
   (4) the film contains 6 mol % or more of diethylene glycol-derived constituent units with respect to 100 mol % of all polyester resin components.

2. A method for producing the heat-shrinkable polyester film according to claim 1, comprising a drawing process in the main shrinking direction and a drawing process in a direction perpendicular to the main shrinking direction.

3. The heat-shrinkable polyester film according to claim 1, wherein the main shrinking direction is a width direction of the film.

4. The heat-shrinkable polyester film according to claim 1, wherein the main shrinking direction is a longitudinal direction of the film.

5. The heat-shrinkable polyester film according to claim 1, wherein the tensile breaking strength in a direction perpendicular to the main shrinking direction of the film is 60 MPa or more and 180 MPa or less.

6. The heat-shrinkable polyester film according to claim 1, wherein the right-angled tearing strength per unit thickness in a direction perpendicular to the main shrinking direction after shrinking by 10% in hot water at 80° C. in the main shrinking direction is 180 N/mm or more and 350 N/mm or less.

7. The heat-shrinkable polyester film according to claim 1, wherein the haze is 2% or more and 18% or less.

8. The heat-shrinkable polyester film according to claim 1, wherein ethylene terephthalate is a main constituent component, and 13 mol % or more of a monomer component capable of forming an amorphous component is contained in all polyester resin components.

9. The heat-shrinkable polyester film according to claim 8, wherein the main shrinking direction is a width direction of the film.

10. The heat-shrinkable polyester film according to claim 9, wherein the tensile breaking strength in a direction perpendicular to the main shrinking direction of the film is 60 MPa or more and 180 MPa or less.

11. The heat-shrinkable polyester film according to claim 10, wherein the right-angled tearing strength per unit thickness in a direction perpendicular to the main shrinking direction after shrinking by 10% in hot water at 80° C. in the main shrinking direction is 180 N/mm or more and 350 N/mm or less.

12. The heat-shrinkable polyester film according to claim 11, wherein the haze is 2% or more and 18% or less.

13. The heat-shrinkable polyester film according to claim 8, wherein the main shrinking direction is a longitudinal direction of the film.

14. The heat-shrinkable polyester film according to claim 13, wherein the tensile breaking strength in a direction perpendicular to the main shrinking direction of the film is 60 MPa or more and 180 MPa or less.

15. The heat-shrinkable polyester film according to claim 14, wherein the right-angled tearing strength per unit thickness in a direction perpendicular to the main shrinking direction after shrinking by 10% in hot water at 80° C. in the main shrinking direction is 180 N/mm or more and 350 N/mm or less.

16. The heat-shrinkable polyester film according to claim 15, wherein the haze is 2% or more and 18% or less.

17. The heat-shrinkable polyester film according to claim 8, wherein the tensile breaking strength in a direction perpendicular to the main shrinking direction of the film is 60 MPa or more and 180 MPa or less.

18. The heat-shrinkable polyester film according to claim 17, wherein the right-angled tearing strength per unit thickness in a direction perpendicular to the main shrinking direction after shrinking by 10% in hot water at 80° C. in the main shrinking direction is 180 N/mm or more and 350 N/mm or less.

19. The heat-shrinkable polyester film according to claim 18, wherein the haze is 2% or more and 18% or less.

20. A package formed by covering at least a part of an outer periphery of an object to be packaged with a label obtained from the heat-shrinkable polyester film according to claim 1 and then shrinking the label on the covered object by heat.

* * * * *